US012716360B2

(12) United States Patent
Bisson et al.

(10) Patent No.: US 12,716,360 B2
(45) Date of Patent: Aug. 25, 2026

(54) AIR LEAKAGE RESTRICTOR ARRANGEMENT FOR AN AIRCRAFT POWERPLANT

(71) Applicant: Pratt & Whitney Canada Corp., Longueuil (CA)

(72) Inventors: Jocelyn Bisson, Saint-Basile-le-Grand (CA); Guy Lefebvre, St-Bruno (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/818,096

(22) Filed: Aug. 28, 2024

(65) Prior Publication Data

US 2026/0063044 A1 Mar. 5, 2026

(51) Int. Cl.
*F01D 11/00* (2006.01)
*F01D 5/02* (2006.01)

(52) U.S. Cl.
CPC .............. *F01D 11/001* (2013.01); *F01D 5/02* (2013.01); *F05D 2240/55* (2013.01); *F05D 2250/711* (2013.01); *F05D 2250/712* (2013.01)

(58) Field of Classification Search
CPC ........ F01D 11/00; F01D 11/001; F01D 11/02; F01D 5/02; F05D 2250/711; F05D 2250/712; F02C 7/28
See application file for complete search history.

(56) References Cited

U.S. PATENT DOCUMENTS 2,888,239 A * 5/1959 Slemmons .............. F01D 5/021 416/213 A
3,989,407 A 11/1976 Cunningham
5,029,439 A 7/1991 Berneuil
5,967,745 A * 10/1999 Tomita ...................... F02C 7/28 415/174.4
6,152,690 A * 11/2000 Tomita .................. F01D 11/127 415/173.7

(Continued)

FOREIGN PATENT DOCUMENTS

EP 3438420 B1 1/2022
KR 20230119954 A * 8/2023 ............. F01D 5/141

OTHER PUBLICATIONS

KR_20230119954_A_MachineTranslation (Kim, J.) Aug. 16, 2023. [retrieved on Jul. 24, 2025] Retrieved from: Espacenet (Year: 2023).*

(Continued)

*Primary Examiner* — Elton K Wong
(74) *Attorney, Agent, or Firm* — Getz Balich LLC

(57) ABSTRACT

An assembly is provided for an aircraft powerplant. This powerplant assembly includes a bladed rotor and a stationary structure. The bladed rotor is rotatable about an axis. The bladed rotor includes a rotor disk and a plurality of rotor blades. The rotor disk includes a web and a rim with a concave disk surface at an inside corner between the web and the rim. The concave disk surface has a disk surface sectional geometry in a reference plane parallel with the axis. The rotor blades are arranged circumferentially around and project radially out from the rim. The stationary structure includes a lip with a convex lip surface. The convex lip surface is next to the concave disk surface. The convex lip surface has a lip surface sectional geometry in the reference plane that matches the disk surface sectional geometry.

17 Claims, 7 Drawing Sheets

(56) References Cited

U.S. PATENT DOCUMENTS

| | | | | |
|---|---|---|---|---|
| 6,339,878 | B1 * | 1/2002 | Owen | B23P 6/005 29/889.7 |
| 6,454,535 | B1 | 9/2002 | Goshorn | |
| 8,161,727 | B2 | 4/2012 | Bart | |
| 9,938,843 | B2 | 4/2018 | Li | |
| 2005/0172608 | A1 | 8/2005 | Lapergue | |
| 2007/0243061 | A1 | 10/2007 | Taylor | |
| 2012/0034072 | A1 * | 2/2012 | Bagnall | F02K 1/32 415/170.1 |
| 2013/0224014 | A1 * | 8/2013 | Aggarwala | F01D 5/143 416/223 R |
| 2017/0107998 | A1 | 4/2017 | Wilber | |
| 2017/0175557 | A1 | 6/2017 | Chouhan | |
| 2022/0098987 | A1 | 3/2022 | Airaudo | |

OTHER PUBLICATIONS

EP Search Report for EP Patent Application No. 25198546.1 dated Jan. 23, 2026.

* cited by examiner

AIR LEAKAGE RESTRICTOR ARRANGEMENT FOR AN AIRCRAFT POWERPLANT

TECHNICAL FIELD

This disclosure relates generally to an aircraft powerplant and, more particularly, to an air leakage restrictor arrangement between a rotor disk and a stationary structure.

BACKGROUND INFORMATION

An aircraft powerplant such as a gas turbine engine may include an air leakage restrictor arrangement between a rotor disk and a stationary structure. Various types and configurations of air leakage restrictor arrangements are known in the art. While these known air leakage restrictor arrangements have various benefits, there is still room in the art for improvement.

SUMMARY

According to an aspect of the present disclosure, an assembly is provided for an aircraft powerplant. This powerplant assembly includes a bladed rotor and a stationary structure. The bladed rotor is rotatable about an axis. The bladed rotor includes a rotor disk and a plurality of rotor blades. The rotor disk includes a web and a rim with a concave disk surface at an inside corner between the web and the rim. The concave disk surface has a disk surface sectional geometry in a reference plane parallel with the axis. The rotor blades are arranged circumferentially around and project radially out from the rim. The stationary structure includes a lip with a convex lip surface. The convex lip surface is next to the concave disk surface. The convex lip surface has a lip surface sectional geometry in the reference plane that matches the disk surface sectional geometry.

According to another aspect of the present disclosure, another assembly is provided for an aircraft powerplant. This powerplant assembly includes a shaft, a bladed rotor and a stationary structure. The bladed rotor is coupled to the shaft and rotatable about an axis. The bladed rotor includes a rotor disk and a plurality of rotor blades. The rotor disk includes an annular disk surface. The annular disk surface has a concave curvature in a reference plane parallel with the axis. The rotor blades are arranged circumferentially around and project radially out from the rotor disk. The stationary structure includes a lip with an annular lip surface. The annular lip surface has a convex curvature in the reference plane. During normal powerplant operation, a gap is formed by and separates the annular disk surface and the annular lip surface. Following a failure in the shaft, the annular disk surface is operable to contact the annular lip surface along a line contact in the reference plane.

According to still another aspect of the present disclosure, another assembly is provided for an aircraft powerplant. This powerplant assembly includes a bladed rotor and a stationary structure. The bladed rotor is rotatable about an axis. The bladed rotor includes a rotor disk and a plurality of rotor blades. The rotor disk includes an annular disk surface. The annular disk surface has a concave curvature in a reference plane parallel with the axis. The rotor blades are arranged circumferentially around the rotor disk. The rotor blades project radially out from the rotor disk into an internal flowpath of the aircraft powerplant. The stationary structure includes a flowpath wall and a lip. The flowpath wall forms a radial inner peripheral boundary of the flowpath downstream of the bladed rotor. The lip is disposed at an axial end of the flowpath wall and recessed radially inward from the flowpath wall. The lip includes an annular lip surface next to the annular disk surface. The annular lip surface has a convex curvature in the reference plane that matches the concave curvature of the annular disk surface.

During a first mode of powerplant operation, a gap may be formed by and separate the concave disk surface and the convex lip surface. During a second mode of powerplant operation, the concave disk surface may be operable to contact the convex lip surface along a line contact in the reference plane.

At least a portion (or an entirety) of the lip surface sectional geometry may be identical to the disk surface sectional geometry in the reference plane.

The disk surface sectional geometry and the lip surface sectional geometry may each be arcuate in the reference plane.

The disk surface sectional geometry and the lip surface sectional geometry may each be curved in the reference plane.

In the reference plane, the disk surface sectional geometry may have a radius that extends from a center point of the disk surface sectional geometry to the concave disk surface. The disk surface sectional geometry may extend circumferentially a number of degrees around the center point of the disk surface sectional geometry. The number of degrees may be equal to or greater than eighty degrees.

In the reference plane, the lip surface sectional geometry may have a radius that extends from a center point of the lip surface sectional geometry to the convex lip surface. The lip surface sectional geometry may extend circumferentially a second number of degrees around the center point of the lip surface sectional geometry. The second number of degrees may be equal to or greater than eighty degrees.

The second number of degrees may be greater than the first number of degrees.

In the reference plane, the lip surface sectional geometry may have a radius that extends from a center point of the lip surface sectional geometry to the convex lip surface. The lip surface sectional geometry may extend circumferentially a number of degrees around the center point of the lip surface sectional geometry. The number of degrees may be equal to or greater than eighty degrees.

The rim may include an inner rim surface that extends axially from the concave disk surface to an axial distal end of the rim. The inner rim surface may have a straight line sectional geometry in the reference plane.

The straight line sectional geometry may be parallel to the axis in the reference plane.

The web may include a side web surface that extends radially away from the axis to the concave disk surface. The side web surface may have a straight line sectional geometry in the reference plane. A radial height of the side web surface may be greater than a radial height of the concave disk surface.

The straight line sectional geometry may be angularly offset from the axis by an acute angle in the reference plane.

The lip may include an outer lip surface that extends axially to the convex lip surface. The outer lip surface may have a straight line sectional geometry in the reference plane.

The straight line sectional geometry may be parallel to the axis in the reference plane.

The lip may include an inner lip surface that extends axially to the convex lip surface. The inner lip surface may have a straight line sectional geometry in the reference plane.

An angle between the convex lip surface and the inner lip surface at an outside corner between the convex lip surface and the inner lip surface may be less than ninety degrees.

The rotor blades may project radially into a flowpath. The stationary structure may also include a flowpath wall that forms a radial inner peripheral boundary of the flowpath downstream of the bladed rotor. The lip may be disposed at an axial end of the flowpath wall. The lip may be radially recessed inward from the flowpath wall.

The bladed rotor may be an integrally bladed rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
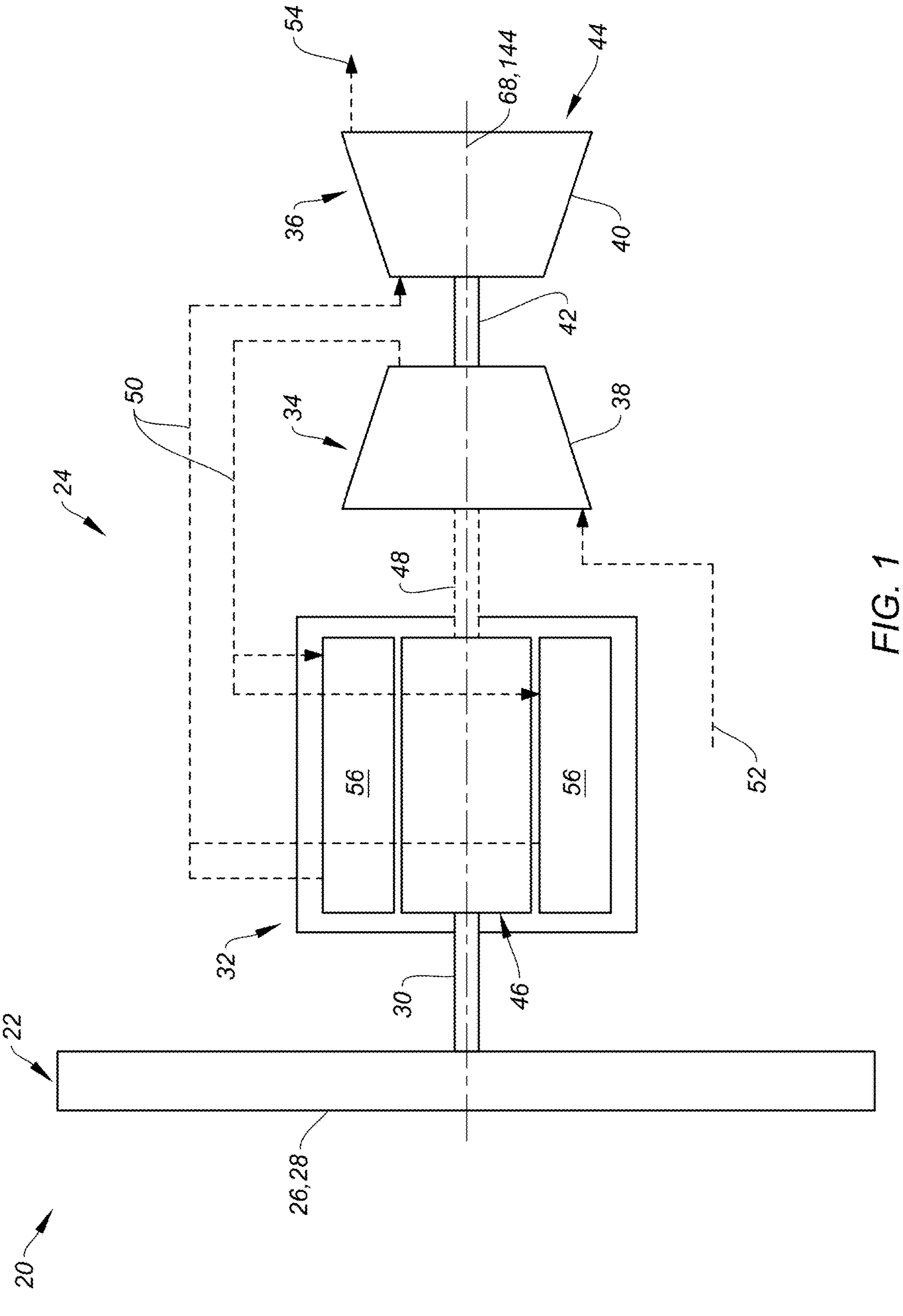
FIG. 1 is a schematic illustration of an aircraft powerplant with an intermittent internal combustion engine.

FIG. 1 illustrates a powerplant 20 for an aircraft. The aircraft may be an airplane, a helicopter, a drone (e.g., an unmanned aerial vehicle (UAV)) or any other manned or unmanned aerial vehicle or system. The powerplant 20 may be configured as, or otherwise included as part of, a propulsion and/or lift system for the aircraft. The powerplant 20 may also or alternatively be configured as, or otherwise included as part of, an electrical power system for the aircraft. The present disclosure, however, is not limited to aircraft applications. The aircraft powerplant 20 of FIG. 1 includes a mechanical load 22 powered by an engine system 24.

The mechanical load 22 may be configured as or otherwise include a rotor 26 mechanically driven by the engine system 24. This driven rotor 26 may be a bladed propulsor rotor 28 for the aircraft propulsion and/or lift system. The propulsor rotor 28 may be an open propulsor rotor (e.g., an un-ducted propulsor rotor) or a ducted propulsor rotor. For example, where the engine system 24 is a propeller engine (e.g., a turbocharged propeller engine, a turbo-compound propeller engine or a turboprop engine), the open propulsor rotor may be a propeller rotor. Where the engine system 24 is a turboshaft engine, the open propulsor rotor may be a rotorcraft rotor such as a helicopter main rotor or a helicopter tail rotor. Where the engine system 24 is a turbofan engine, the ducted propulsor rotor may be a fan rotor. Alternatively, the driven rotor 26 may be configured as a generator rotor of an electric power generator for the aircraft electrical power system; e.g., an auxiliary power unit (APU) system. The present disclosure, however, is not limited to the foregoing exemplary mechanical loads nor to the foregoing exemplary engine systems. The engine system 24, for example, may alternatively be configured as a turbojet engine, a propfan engine, a pusher fan engine or any other type of turbine engine operable to power the operation of the mechanical load 22. However, for ease of description, the driven rotor 26 is described below as the propulsor rotor 28.

The engine system 24 of FIG. 1 is operatively coupled to the propulsor rotor 28 (the driven rotor 26) through a drivetrain 30. This drivetrain 30 may be a direct drive drivetrain or a geared drivetrain. Note, while the propulsor rotor 28 is shown coaxial with the engine system 24 in FIG. 1, it is contemplated axes of the propulsor rotor 28 and the engine system 24 may be laterally and/or angularly offset from one another in other embodiments.

The engine system 24 may be configured as a turbocharged or turbo-compound engine. The engine system 24 of FIG. 1, for example, includes an intermittent internal combustion (IC) engine 32, a compressor section 34 (e.g., an engine compressor) and a turbine section 36 (e.g., an engine turbine). The internal combustion engine 32 may be configured as a rotary engine or a reciprocating piston engine. An example of the rotary engine is a Wankel engine. Examples of the reciprocating piston engine include a radial engine, an inline (I) engine, a V-engine and a W-engine. The compressor section 34 includes a bladed compressor rotor 38. The turbine section 36 includes a bladed turbine rotor 40. This turbine rotor 40 is coupled to and rotatable with the compressor rotor 38. The turbine rotor 40 of FIG. 1, for example, is connected to the compressor rotor 38 through a shaft 42. At least (or only) a combination of the compressor rotor 38, the turbine rotor 40 and the shaft 42 may collectively form a turbo-compressor rotating assembly 44; e.g., a spool. This turbo-compressor rotating assembly 44 may be rotationally discrete from an internal rotating assembly 46 of the internal combustion engine 32. Alternatively, the turbo-compressor rotating assembly 44 may be operatively coupled to and rotatable with the engine rotating assembly 46 through a drivetrain 48 (see dashed line). This drivetrain 48 may be a direct drive drivetrain or a geared drivetrain.

The aircraft powerplant 20 and its engine system 24 include an internal powerplant flowpath 50; e.g., a core flowpath. This powerplant flowpath 50 longitudinally extends from an inlet 52 into the aircraft powerplant 20 and its engine system 24 to a combustion products exhaust 54 from the aircraft powerplant 20 and its engine system 24. More particularly, the powerplant flowpath 50 longitudinally extends sequentially through the compressor section 34, through one or more combustion zones 56 (e.g., combustion chambers, cylinder chambers, etc.) within the internal combustion engine 32, and through the turbine section 36 from the flowpath inlet 52 to the flowpath exhaust 54. With this arrangement, air delivered to the internal combustion engine 32 is compressed by the compressor rotor 38, and combustion products produced by combustion of a mixture of the compressed air and fuel within the combustion zone(s) 56 drives rotation of the engine rotating assembly 46 and the turbine rotor 40. The rotation of the engine rotating assembly 46 drives rotation of the propulsor rotor 28 (the driven rotor 26). The rotation of the turbine rotor 40 drives rotation of the compressor rotor 38 to facilitate the compression of the incoming air to the internal combustion engine 32. The rotation of the turbine rotor 40 may also assist driving rotation of the engine rotating assembly 46 where the turbo-compressor rotating assembly 44 is coupled to the engine rotating assembly 46 through the optional direct drive or geared drivetrain 48.

Figure 2:
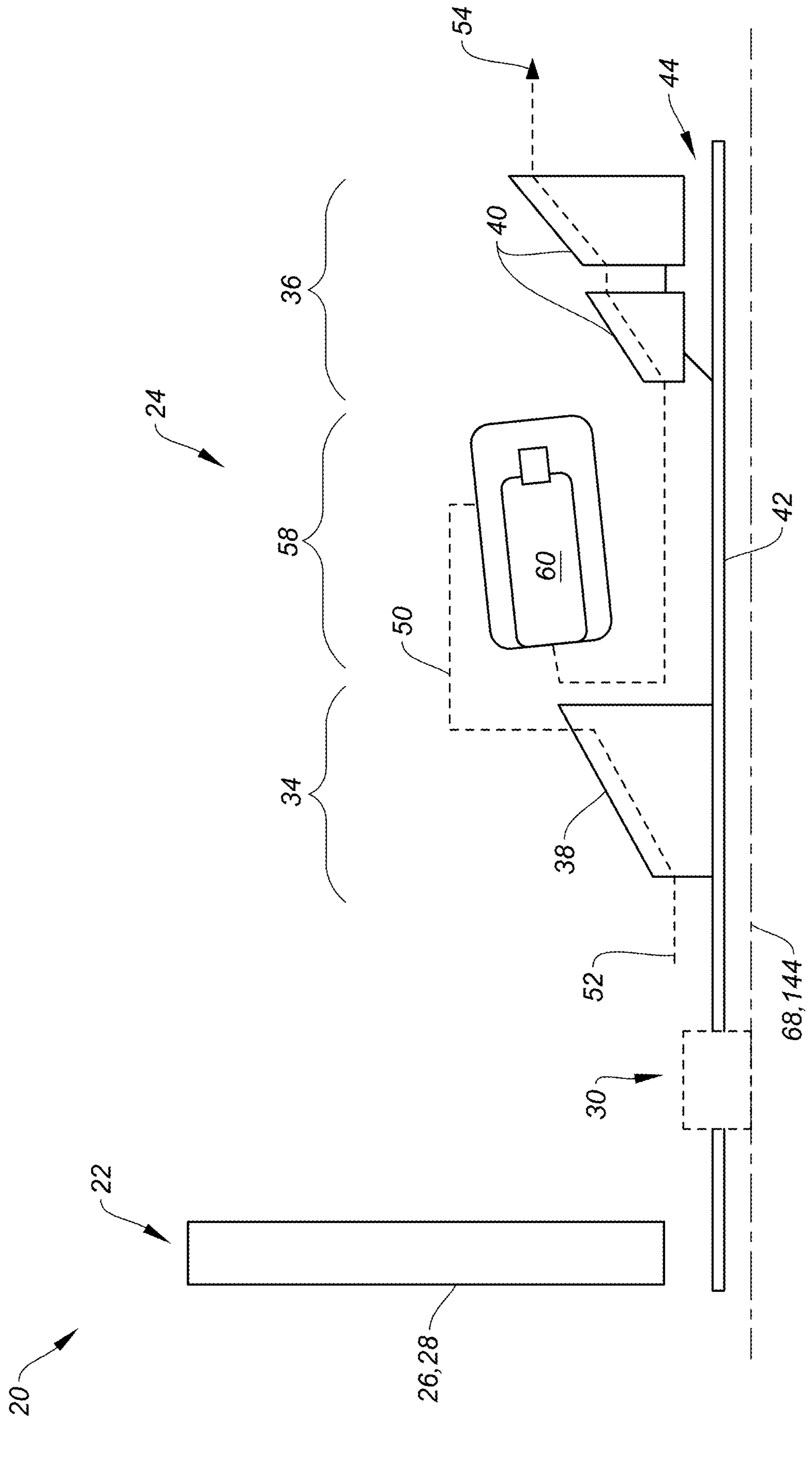
FIG. 2 is a partial schematic illustration of the aircraft powerplant with a gas turbine engine.

While the engine system 24 is described above as including the internal combustion engine 32 fluidly coupled between the compressor section 34 and the turbine section 36, the aircraft powerplant 20 of the present disclosure is not limited to such an exemplary arrangement as described above. For example, referring to FIG. 2, the engine system 24 may alternatively be configured as a gas turbine engine where the internal combustion engine 32 of FIG. 1 is replaced by a combustor section 58 of FIG. 2. With such an arrangement, the powerplant flowpath 50 longitudinally extends sequentially through the compressor section 34, through a combustion chamber 60 (e.g., an annular combustion chamber) within the combustor section 58, and through the turbine section 36 from the flowpath inlet 52 to the flowpath exhaust 54. For ease of illustration, the turbine engine of FIG. 2 is shown as a single spool turbine engine. It is contemplated, however, the turbine engine may alternatively include two or more spools; e.g., two or more internal rotating assemblies.

Figure 3:
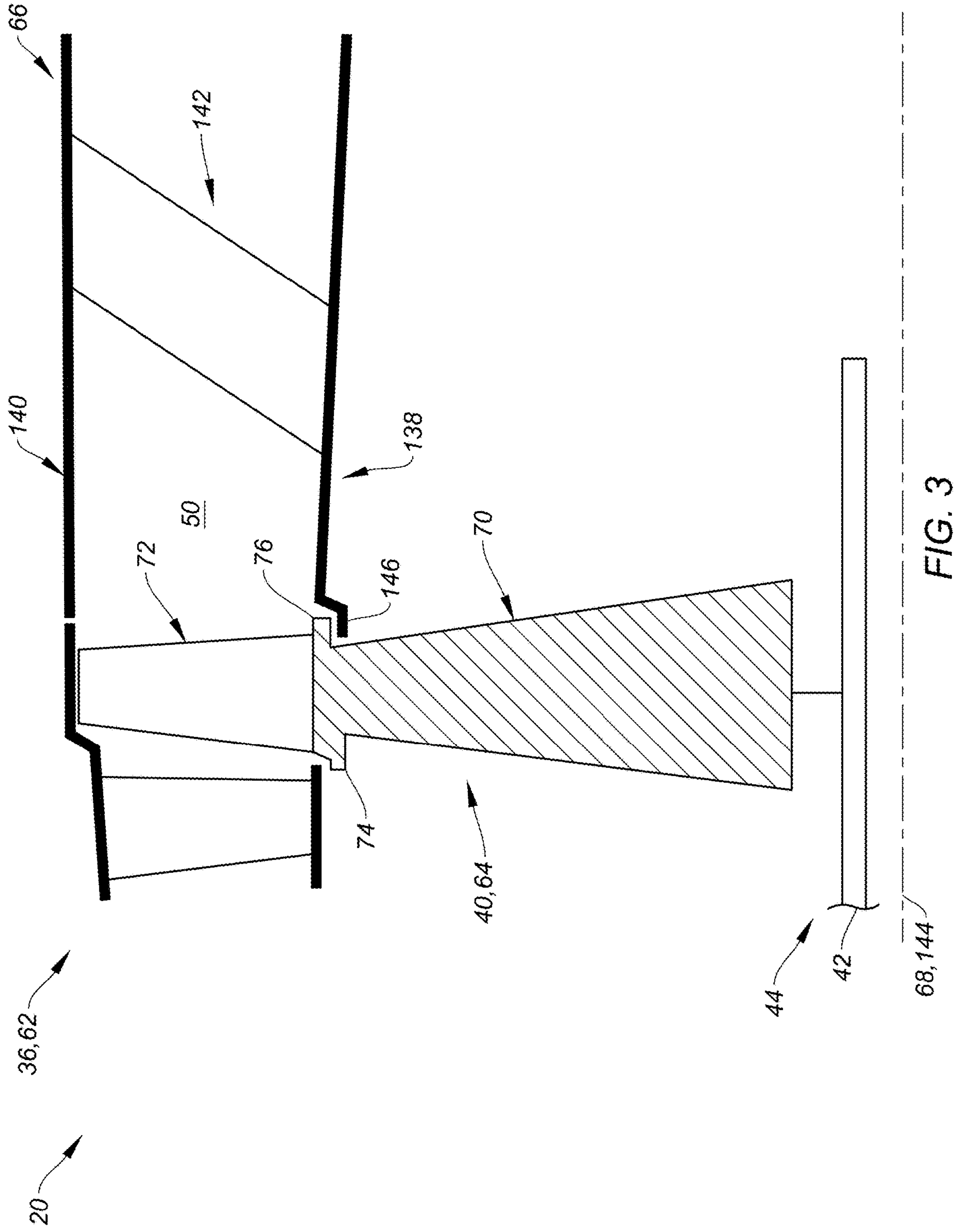
FIG. 3 is a partial schematic sectional illustration of a section of the aircraft powerplant with a bladed powerplant rotor with a stationary structure.

FIG. 3 partially illustrates a section 62 of the aircraft powerplant 20. This powerplant section 62 includes a bladed powerplant rotor 64 and a stationary structure 66. For ease of description, the powerplant section 62 is described below as the turbine section 36, and the powerplant rotor 64 is described below as forming a stage (or an entirety) of the turbine rotor 40 within the turbine section 36. The powerplant section 62 of the present disclosure, however, is not limited to such an exemplary configuration. It is contemplated, for example, the powerplant section 62 may alternatively be configured as the compressor section 34, and the powerplant rotor 64 may alternatively be form a stage (or an entirety) of the compressor rotor 38 within the compressor section 34.

The powerplant rotor 64 is configured to rotate about a centerline axis 68 of the powerplant rotor 64. The powerplant rotor 64 may be configured as an integrally bladed rotor (IBR). The powerplant rotor 64 of FIG. 4, for example, includes a rotor disk 70 (e.g., a turbine disk) and a plurality of rotor blades 72 (e.g., turbine blades) permanently connected to the rotor disk 70. The rotor disk 70 and the rotor blades 72, for example, may be machined and/or otherwise manufactured together as a single unitary body; here, a monolithic body. Alternatively, the rotor blades 72 may be discretely formed from the rotor disk 70 and then welded or otherwise bonded to the rotor disk 70 to provide the single unitary body. Herein, the term "unitary" may describe a body without severable parts. By contrast, a traditional bladed rotor includes rotor blades which are mechanically attached to a rotor disk through, for example, dovetail interfaces, firtree interfaces or other removeable attachments. The present disclosure, however, is not limited to such an exemplary integrally bladed rotor configuration.

Figure 4:
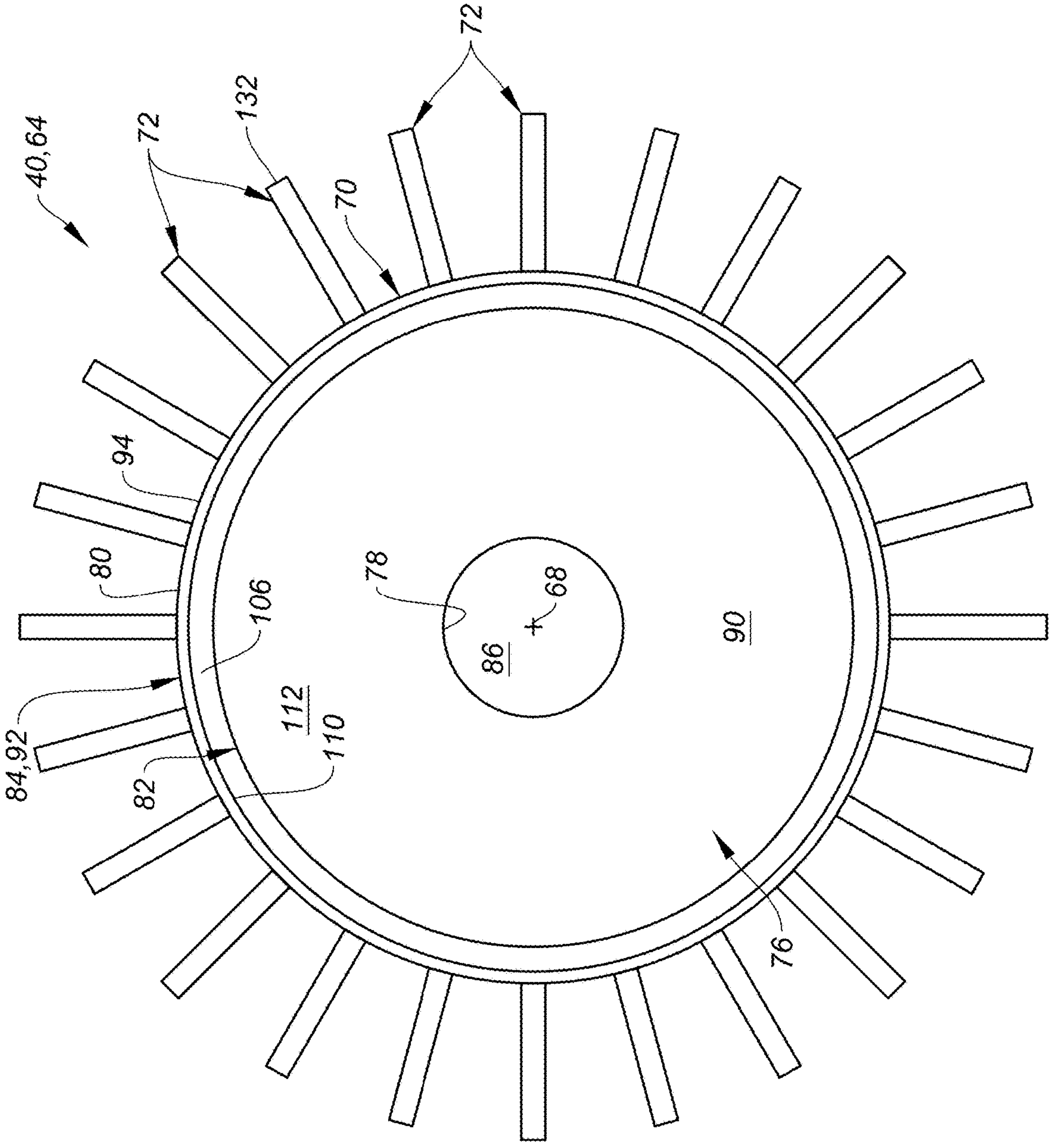
FIG. 4 is an end view schematic illustration of the powerplant rotor.
Figure 5:
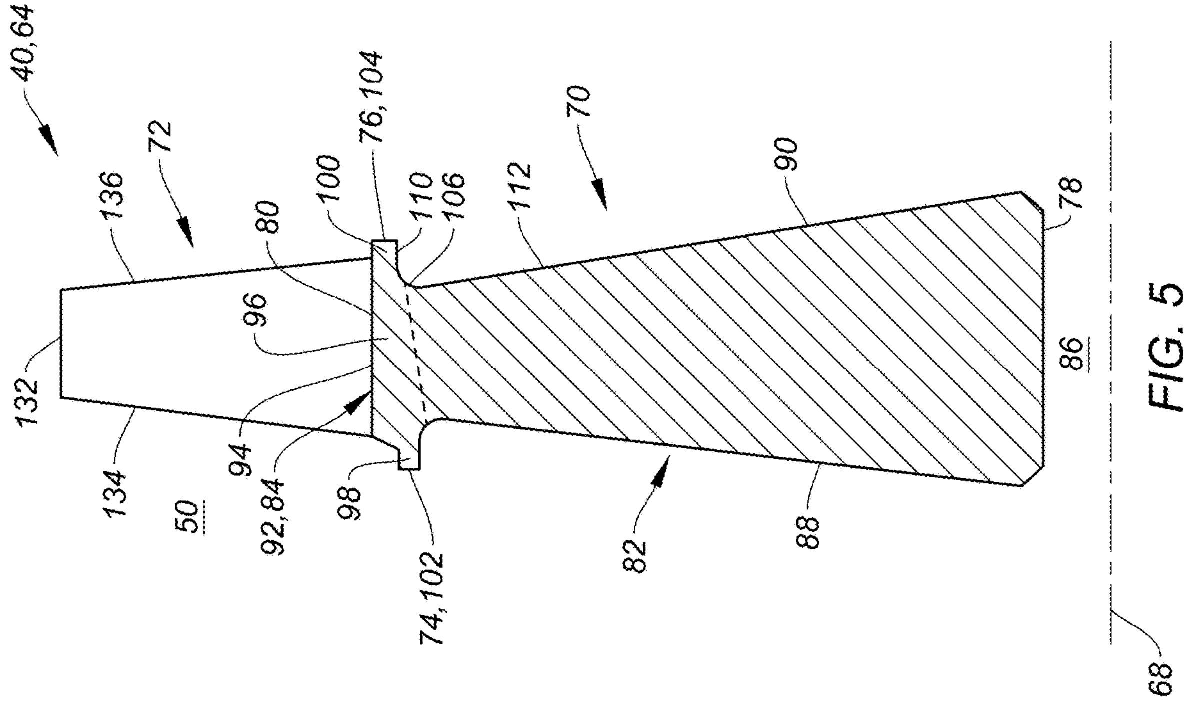
FIG. 5 is a partial schematic sectional illustration of the powerplant rotor.

Referring to FIG. 5, the rotor disk 70 extends axially along the rotor axis 68 between and to an axial upstream side 74 of the powerplant rotor 64 and its rotor disk 70 and an axial downstream side 76 of the powerplant rotor 64 and its rotor disk 70. The rotor upstream side 74 is upstream of the rotor downstream side 76 along the powerplant flowpath 50 (see FIG. 3). The rotor disk 70 extends radially from a radial inner side 78 of the powerplant rotor 64 and its rotor disk 70 to a radial outer side 80 of the rotor disk 70. The rotor disk 70 of FIG. 5 includes an annular disk web 82 and an annular disk rim 84. Referring to FIG. 4, the rotor disk 70 and each of its members 82 and 84 extend circumferentially about (e.g., completely around) the rotor axis 68, providing the rotor disk 70 and each of its members 82 and 84 with a full-hoop (e.g., annular) geometry.

Referring to FIG. 5, the disk web 82 projects radially outward away from the rotor axis 68 to the disk rim 84. The disk web 82 of FIG. 5, for example, extends radially from the rotor inner side 78 to the disk rim 84. With this arrangement, the disk web 82 forms and circumscribes an inner bore 86 of the powerplant rotor 64, which inner bore 86 extends axially along the rotor axis 68 through the powerplant rotor 64 and its rotor disk 70. The disk web 82 extends axially along the rotor axis 68 between and to opposing axial sides 88 and 90 of the disk web 82. The web upstream side 88 of FIG. 5 is axially recessed from the rotor upstream side 74. The web downstream side 90 of FIG. 5 is axially recessed from the rotor downstream side 76.

The disk rim 84 is disposed at the disk outer side 80 and forms a radial outer periphery of the rotor disk 70. This disk rim 84 also forms a radial inner platform 92 of the powerplant rotor 64. A radial outer surface 94 of the inner platform 92 forms an inner peripheral boundary of the powerplant flowpath 50 longitudinally (e.g., axially in FIG. 5) across the powerplant rotor 64.

The disk rim 84 of FIG. 5 includes a rim base 96, an axial upstream flange 98 and an axial downstream flange 100. The rim base 96 is axially aligned with and radially outboard of the disk web 82. This rim base 96 integrally connects the upstream flange 98 and the downstream flange 100 to the disk web 82. The upstream flange 98 projects axially along the rotor axis 68 (in an upstream direction along the powerplant flowpath 50) out from the rim base 96 and the disk web 82 to an axial distal end 102 of the upstream flange 98 at the rotor upstream side 74. The upstream flange 98 of FIG. 5 is radially recessed inward from the inner platform 92 and its platform outer surface 94. The downstream flange 100 projects axially along the rotor axis 68 (in a downstream direction along the powerplant flowpath 50) out from the rim base 96 and the disk web 82 to an axial distal end 104 of the downstream flange 100 at the rotor downstream side 76. The rim base 96 and the downstream flange 100 may collectively form the inner platform 92 and its platform outer surface 94. The rim base 96 of FIG. 5, for example, forms an axial upstream section of the platform outer surface 94 which extends along the rotor blades 72. The downstream flange 100 of FIG. 5 forms an axial downstream section of the platform outer surface 94 disposed downstream of the rotor blades 72.

Figure 6:
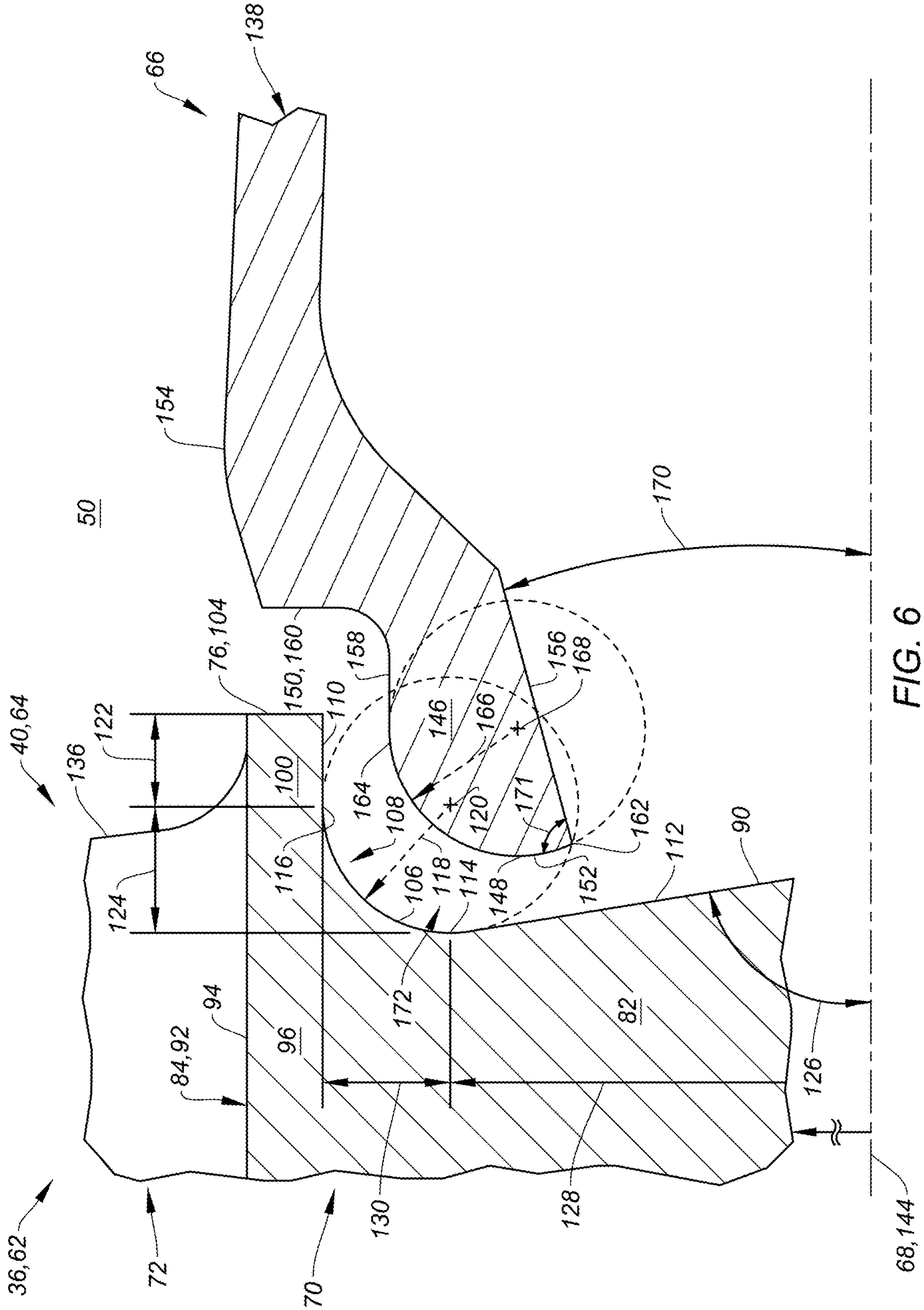
FIG. 6 is a partial schematic sectional illustration of the aircraft powerplant at an open interface between a lip of the stationary structure and a disk of the powerplant rotor.

Referring to FIG. 6, the rotor disk 70 includes a concave disk surface 106 at an inside corner 108 between the disk rim 84 and the disk web 82. This concave disk surface 106 is collectively formed by the disk rim 84 and the disk web 82 at an intersection between the disk rim 84 and the disk web 82. The concave disk surface 106 provides an eased (e.g., curved) transition between a radial inner rim surface 110 and an axial side web surface 112. Briefly, the inner rim surface 110 of FIG. 6 is formed by the disk rim 84 and its downstream flange 100 at a radial inner side of the downstream flange 100. The side web surface 112 of FIG. 6 is formed by the disk web 82 at the web downstream side 90. Referring to FIG. 4, each of the rotor disk surfaces 106, 110 and 112 may extend circumferentially about (e.g., completely around) the rotor axis 68, providing each of the rotor disk surfaces 106, 110 and 112 with a full-hoop (e.g., annular and/or tubular) geometry.

Figure 7:
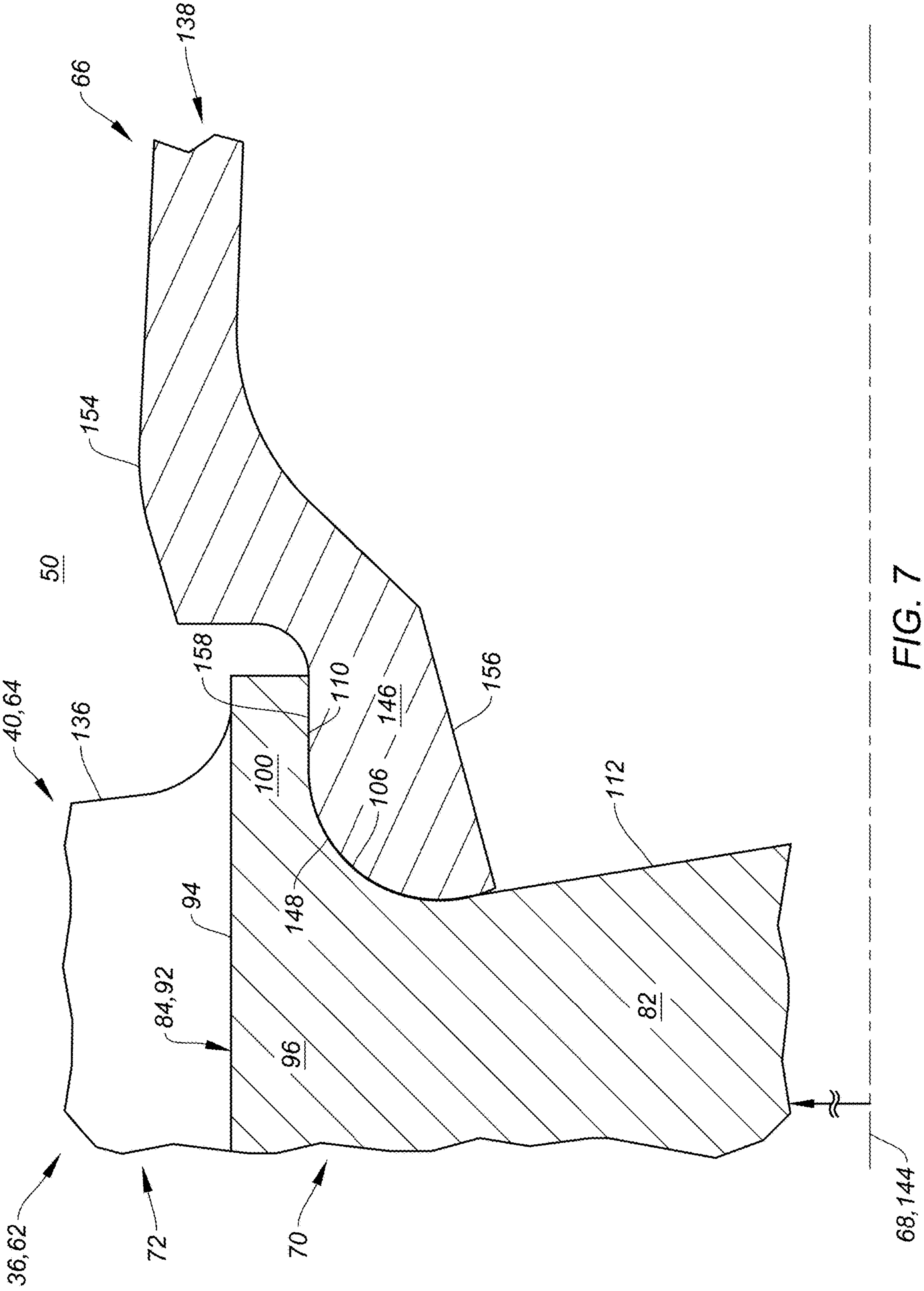
FIG. 7 is a partial schematic sectional illustration of the aircraft powerplant at a closed interface between the lip of the stationary structure and the disk of the powerplant rotor.

Referring to FIG. 6, the concave disk surface 106 has a disk surface sectional geometry when viewed, for example, in a reference plane parallel with (e.g., including) the rotor axis 68; e.g., plane of FIGS. 6 and 7. The concave disk surface 106 follows this disk surface sectional geometry as the concave disk surface 106 extends from a radial outer end 114 of the side web surface 112 to an axial end 116 of the inner rim surface 110. The disk surface sectional geometry of FIG. 6 is arcuate; e.g., partially circular, partially elliptical, or otherwise curved and concave. The concave disk surface 106 of FIG. 6 and its disk surface sectional geometry, for example, may follow a continuous curvature from the web surface end 114 to the rim surface end 116 in the reference plane.

In the reference plane, the disk surface sectional geometry has a curvature radius 118 that projects out from a center point 120 of the disk surface sectional geometry to the concave disk surface 106. The disk surface curvature radius 118 may remain uniform (e.g., constant) as the concave disk surface 106 and its disk surface sectional geometry extend circumferentially about the center point 120 in the reference plane. Alternatively, the disk surface curvature radius 118 may vary (e.g., increase and/or decrease) as the concave disk surface 106 and its disk surface sectional geometry extend circumferentially about the center point 120 in the reference plane. The concave disk surface 106 and its disk surface sectional geometry extend circumferentially a select number of degrees around the center point 120 from the web surface end 114 to the rim surface end 116. This concave disk surface number of degrees may be equal to or greater than eighty degrees (80°) or ninety degrees (90°). The concave disk surface number of degrees in FIG. 6, for example, may be between ninety-five degrees (95°) and one-hundred and ten degrees (110°). The present disclosure, however, is not limited to the foregoing exemplary arrangements. For example, depending on a taper of the disk web 82 and/or the downstream flange 100, the concave disk surface number of degrees may alternatively be less than eighty degrees.

The inner rim surface 110 of FIG. 6 extends axially from a radial outer end of the concave disk surface 106 to (or about) the downstream flange distal end 104. This inner rim surface 110 has a rim surface sectional geometry when viewed, for example, in the reference plane. This rim surface sectional geometry may be a straight line sectional geometry. The inner rim surface 110 and its rim surface sectional geometry may be arranged parallel to the rotor axis 68 in the reference plane. However, in other embodiments, it is contemplated that the inner rim surface 110 and its rim surface sectional geometry may alternatively be (e.g., slightly) angularly offset from the rotor axis 68 in the reference plane. The inner rim surface 110 and its rim surface sectional geometry, for example, may be pitched radially outward away from the rotor axis 68 as the inner rim surface 110 extends towards the downstream flange distal end 104.

The inner rim surface 110 of FIG. 6 has an overall axial length 122 measured along the rotor axis 68 between the rim surface end 116 and the downstream flange distal end 104. This rim surface length 122 may be sized equal to or less than an overall axial length 124 of the concave disk surface 106 along the rotor axis 68.

The side web surface 112 of FIG. 6 extends radially outward to a radial inner end of the concave disk surface 106. This side web surface 112 has a web surface sectional geometry when viewed, for example, in the reference plane. At least adjacent the concave disk surface 106, the web surface sectional geometry may be a straight line sectional geometry. The side web surface 112 and its web surface sectional geometry may be angularly offset from the rotor axis 68 by an offset angle 126 in the reference plane. This offset angle 126 may be an acute angle less than ninety degrees (90°) and equal to or greater than seventy degrees (70°). Here, the side web surface 112 and its web surface sectional geometry may be pitched radially outward away from the rotor axis 68 as the side web surface 112 extends axially away from the downstream flange distal end 104. However, in other embodiments, it is contemplated the side web surface 112 and its web surface sectional geometry may alternatively be arranged perpendicular to the rotor axis 68 in the reference plane.

The side web surface 112 of FIG. 6 has an overall radial height 128 measured from the rotor inner side 78 (see FIG. 5) to the web surface end 114. This web surface height 128 is sized greater than an overall radial height 130 of the concave disk surface 106.

Referring to FIG. 4, the rotor blades 72 are arranged and may be equispaced circumferentially around the rotor axis 68 in an annular array; e.g., a circular array. This array of rotor blades 72 is disposed radially outboard of and circumscribes the rotor disk 70 and its inner platform 92. Referring to FIG. 5, each rotor blade 72 projects radially out from the rotor disk 70 and its platform outer surface 94, into and substantially radially across the powerplant flowpath 50, to a tip 132 of the respective rotor blade 72. Each rotor blade 72 extends longitudinally along a camber line of the respective rotor blade 72 from a leading edge 134 of the respective rotor blade 72 to a trailing edge 136 of the respective rotor blade 72. Each rotor blade 72 extends laterally (e.g., in a direction perpendicular to the camber line) between and to a concave, pressure side of the respective rotor blade 72 and a convex, suction side of the respective rotor blade 72. These opposing lateral sides of the respective rotor blade 72 extend longitudinally along the camber line and meet at the leading edge 134 and the trailing edge 136.

Referring to FIG. 3, the stationary structure 66 includes a radial inner flowpath wall 138, a radial outer flowpath wall 140 and one or more stator vanes 142; e.g., exit guide vanes. The inner flowpath wall 138 and the outer flowpath wall 140 each extend longitudinally along the powerplant flowpath 50; e.g., axially along a centerline axis 144 of the stationary structure 66 which may be coaxial with the rotor axis 68. The inner flowpath wall 138 and the outer flowpath wall 140 each extend circumferentially about (e.g., completely around) the structure axis 144, providing each flowpath wall 138, 140 with a full-hoop (e.g., tubular) geometry. The inner flowpath wall 138 forms a radial inner peripheral boundary of a section of the powerplant flowpath 50 adjacent and downstream of the powerplant rotor 64. The outer flowpath wall 140 forms a radial outer peripheral boundary of the section of the powerplant flowpath 50 adjacent and downstream of the powerplant rotor 64. The stator vanes 142 are arranged and may be equispaced circumferentially around the structure axis 144 in an annular array (e.g., a circular array), which array of the stator vanes 142 are spaced longitudinally downstream of the powerplant rotor 64 along the powerplant flowpath 50. Each of these stator vanes 142 project radially across the powerplant flowpath 50 between, for example, the inner flowpath wall 138 and the outer flowpath wall 140. Each of the stator vanes 142 may also be attached to the inner flowpath wall 138 and the outer flowpath wall 140. With this arrangement of FIG. 3, the stationary structure 66 may be configured as a turbine exhaust case (TEC). The present disclosure, however, is not limited to such an exemplary arrangement. For example, in other embodiments, the stationary structure 66 and its stator vanes 142 may be arranged along the powerplant flowpath 50 between the powerplant rotor 64 and another powerplant rotor; e.g., between two turbine rotors, or between two stages of a single turbine rotor.

Referring to FIG. 6, the stationary structure 66 includes an inner lip 146 configured to form a controlled gap air leakage restrictor with the powerplant rotor 64 and its rotor disk 70. This inner lip 146 is further configured to form an element for braking rotation of the powerplant rotor 64 in an unlikely event of a failure in the shaft 42 (see FIG. 3) (e.g., a shaft shear event) as described below in further detail.

The inner lip 146 is formed integral with or otherwise attached to the inner flowpath wall 138. The inner lip 146 is located at an upstream axial distal end 150 of the inner flowpath wall 138. The inner lip 146 of FIG. 6, for example, projects axially out from the inner flowpath wall 138 at its distal end 150 to a convex lip surface 152 of the inner lip 146 at an axial distal end 148 of the inner lip 146. The inner lip 146 is also recessed radially inward from a radial outer surface 154 of the inner flowpath wall 138, which wall outer surface 154 forms the inner peripheral boundary of the powerplant flowpath section downstream of the powerplant rotor 64. The inner lip 146 of FIG. 6, for example, extends radially from a radial inner lip surface 156 of the inner lip 146 to a radial outer lip surface 158 of the inner lip 146, where the outer lip surface 158 is spaced radially inward from the wall outer surface 154. With this arrangement, a shelf 160 formed by the distal end 150 of the inner flowpath wall 138 extends radially between and to the outer lip surface 158 and the wall outer surface 154. The inner lip 146 and each of its lip surfaces 152, 156, 158 as well as the shelf 160 extend circumferentially about (e.g., completely around) the structure axis 144, providing each of those elements 152, 156, 158, 160 with a full-hoop (e.g., annular and/or tubular) geometry.

The convex lip surface 152 has a lip surface sectional geometry when viewed, for example, in the reference plane. The convex lip surface 152 follows this lip surface sectional geometry as the convex lip surface 152 extends from an axial upstream end 162 of the inner lip surface 156 to an axial upstream end 164 of the outer lip surface 158. The lip surface sectional geometry of FIG. 6 is arcuate; e.g., partially circular, partially elliptical, or otherwise curved and concave. The convex lip surface 152 of FIG. 6 and its lip surface sectional geometry, for example, may follow a continuous curvature from the inner lip surface end 162 to the outer lip surface end 164 in the reference plane.

The convex lip surface 152 is configured such that its lip surface sectional geometry substantially or completely matches the disk surface sectional geometry in the reference plane. The lip surface sectional geometry and the disk surface sectional geometry, for example, may have substantially or completely identical curvatures/shapes in the reference plane. The lip surface sectional geometry and the disk surface sectional geometry may also have substantially or completely identical dimensions in the reference plane. With such an arrangement, in an unlikely event that the convex lip surface 152 and the concave disk surface 106 were to contact one another as shown in FIG. 7, the contact between the convex lip surface 152 and the concave disk surface 106 may be a line contact (opposed to a point contact) when viewed in the reference plane.

Referring to FIG. 6, in the reference plane, the lip surface sectional geometry has a curvature radius 166 that projects out from a center point 168 of the lip surface sectional geometry to the convex lip surface 152. The lip surface curvature radius 166 may remain uniform (e.g., constant) as the convex lip surface 152 and its lip surface sectional geometry extend circumferentially about the center point 168 in the reference plane. Alternatively, the lip surface curvature radius 166 may vary (e.g., increase and/or decrease) as the convex lip surface 152 and its lip surface sectional geometry extend circumferentially about the center point 168 in the reference plane. The convex lip surface 152 and its lip surface sectional geometry extend circumferentially a select number of degrees around the center point 168 from the inner lip surface end 162 to the outer lip surface end 164. This convex lip surface number of degrees may be equal to or greater than eighty degrees (80°) or ninety degrees (90°). The convex lip surface number of degrees in FIG. 6, for example, may be between ninety-five degrees (95°) and one-hundred and twenty degrees (120°). In the embodiment of FIG. 6, the convex lip surface number of degrees is greater than the concave disk surface number of degrees. With such an arrangement, referring to FIG. 7, a corner between the convex lip surface 152 and the inner lip surface 156 is spaced away from and thereby would not contact the rotor disk 70. However, in other embodiments, it is contemplated the convex lip surface number of degrees in FIG. 6 may alternatively be equal to the concave disk surface number of degrees.

The inner lip surface 156 of FIG. 6 extends radially inward and axially to a radial inner end of the convex lip surface 152. This inner lip surface 156 has an inner lip surface sectional geometry when viewed, for example, in the reference plane. At least adjacent the convex lip surface 152, the inner lip surface sectional geometry may be a straight line sectional geometry. The inner lip surface 156 and its inner lip surface sectional geometry may be angularly offset from the structure axis 144 by an offset angle 170 in the reference plane. This offset angle 170 may be an acute angle greater than zero degrees (0°) and equal to or less than thirty degrees (30°) or forty-five degrees (45°). The inner lip surface 156 and its inner lip surface sectional geometry may also be angularly offset from the lip inner surface 156 and its lip inner surface sectional geometry by an offset angle 171 in the reference plane. This offset angle 171 may be an acute angle less than ninety degrees (90°). Here, the inner lip surface 156 and its inner lip surface sectional geometry may be pitched radially outward away from the structure axis 144 as the inner lip surface 156 extends axially away from the inner lip distal end 148. However, in other embodiments, it is contemplated the inner lip surface 156 and its inner lip surface sectional geometry may alternatively be arranged parallel to the structure axis 144 in the reference plane and/or have a curved shape.

The outer lip surface 158 of FIG. 6 extends axially from a radial outer end of the convex lip surface 152 to a radial inner end of the shelf 160. This outer lip surface 158 has an outer lip surface sectional geometry when viewed, for example, in the reference plane. This outer lip surface sectional geometry may be a straight line sectional geometry. The outer lip surface 158 and its outer lip surface sectional geometry may be arranged parallel to the rotor axis 68 in the reference plane. More particularly, the outer lip surface 158 may be configured such that its outer lip surface sectional geometry substantially or completely matches the rim surface sectional geometry in the reference plane.

Referring still to FIG. 6, during one or more normal modes of powerplant operation, the inner lip 146 and its convex lip surface 152 are disposed next to, but do not contact, the rotor disk 70 and its concave disk surface 106. An air gap 172, for example, is formed by and extends (e.g., uninterrupted) between the convex lip surface 152 and the concave disk surface 106. The provision of this air gap 172 facilitates rotation of the powerplant rotor 64 about its rotor axis 68 without impedance from the stationary structure 66 and its inner lip 146. However, by matching the convex lip surface 152 to the concave disk surface 106, a relatively low leakage labyrinth seal is formed between the rotor disk 70 and the inner lip 146. By contrast, during one or more other (e.g., failure) modes of powerplant operation, the inner lip 146 and its convex lip surface 152 may contact the rotor disk 70 and its concave disk surface 106. For example, in an unlikely event that the shaft 42 (see FIG. 3) fails (e.g., shears) during powerplant operation, the powerplant rotor 64 (e.g., the turbine rotor 40) may shift axially aft along the rotor axis 68 until the concave disk surface 106 and the convex lip surface 152. As shown in FIG. 7, this contact may be a line contact in the reference plane. Such a line contact distributes contact force between the concave disk surface 106 contacts the convex lip surface 152. The contact between the concave disk surface 106 and the convex lip surface 152 may thereby function to brake rotation of the powerplant rotor 64 about its rotor axis 68, for example, without or with minimal wear of the rotor disk 70. By contrast, if an inner lip was to contact a rotor disk at a single point in a reference plane, then the inner lip may cut a notch into the rotor disk which may significantly impair a structural integrity of the rotor disk.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft powerplant, comprising:

a bladed rotor rotatable about an axis, the bladed rotor including a rotor disk and a plurality of rotor blades, the rotor disk including a web and a rim with a concave disk surface at an inside corner between the web and the rim, the concave disk surface having a disk surface sectional geometry in a reference plane parallel with the axis, and the plurality of rotor blades arranged circumferentially around and projecting radially out from the rim; and a stationary structure comprising a lip with a convex lip surface, the convex lip surface next to the concave disk surface, and the convex lip surface having a lip surface sectional geometry in the reference plane that matches the disk surface sectional geometry;

wherein at least a portion of the lip surface sectional geometry is identical to the disk surface sectional geometry in the reference plane in shape and dimension.

2. The assembly of claim 1, wherein during a first mode of powerplant operation, a gap is formed by and separates the concave disk surface and the convex lip surface; and during a second mode of powerplant operation, the concave disk surface is operable to contact the convex lip surface along a line contact in the reference plane.

3. The assembly of claim 1, wherein the disk surface sectional geometry and the lip surface sectional geometry are each arcuate in the reference plane.

4. The assembly of claim 1, wherein the disk surface sectional geometry and the lip surface sectional geometry are each curved in the reference plane.

5. The assembly of claim 1, wherein, in the reference plane, the disk surface sectional geometry has a radius that extends from a center point of the disk surface sectional geometry to the concave disk surface, the disk surface sectional geometry extends circumferentially a number of degrees around the center point of the disk surface sectional geometry, and the number of degrees is equal to or greater than eighty degrees.

6. The assembly of claim 5, wherein, in the reference plane, the lip surface sectional geometry has a radius that extends from a center point of the lip surface sectional geometry to the convex lip surface, the lip surface sectional geometry extends circumferentially a second number of degrees around the center point of the lip surface sectional geometry, and the second number of degrees is equal to or greater than eighty degrees.

7. The assembly of claim 6, wherein the second number of degrees is greater than the first number of degrees.

8. The assembly of claim 1, wherein the rim includes an inner rim surface that extends axially from the concave disk surface to an axial distal end of the rim; and the inner rim surface has a straight line sectional geometry in the reference plane.

9. The assembly of claim 8, wherein the straight line sectional geometry is parallel to the axis in the reference plane.

10. The assembly of claim 1, wherein the web includes a side web surface that extends radially away from the axis to the concave disk surface;

the side web surface has a straight line sectional geometry in the reference plane; and a radial height of the side web surface is greater than a radial height of the concave disk surface.

11. The assembly of claim 10, wherein the straight line sectional geometry is angularly offset from the axis by an acute angle in the reference plane.

12. The assembly of claim 1, wherein the lip includes an outer lip surface that extends axially to the convex lip surface; and the outer lip surface has a straight line sectional geometry in the reference plane.

13. The assembly of claim 12, wherein the straight line sectional geometry is parallel to the axis in the reference plane.

14. The assembly of claim 1, wherein the lip includes an inner lip surface that extends axially to the convex lip surface; and the inner lip surface has a straight line sectional geometry in the reference plane; and the inner lip surface at the straight line sectional geometry is angularly offset from the axis by an offset angle in the reference plane.

15. The assembly of claim 14, wherein an angle between the convex lip surface and the inner lip surface at an outside corner between the convex lip surface and the inner lip surface is less than ninety degrees.

16. The assembly of claim 1, wherein the plurality of rotor blades project radially into a flowpath;

the stationary structure further comprises a flowpath wall that forms a radial inner peripheral boundary of the flowpath downstream of the bladed rotor; and the lip is disposed at an axial end of the flowpath wall, and the lip is radially recessed inward from the flowpath wall.

17. The assembly of claim 1, wherein the bladed rotor is an integrally bladed rotor.

* * * * *